UNITED STATES PATENT OFFICE.

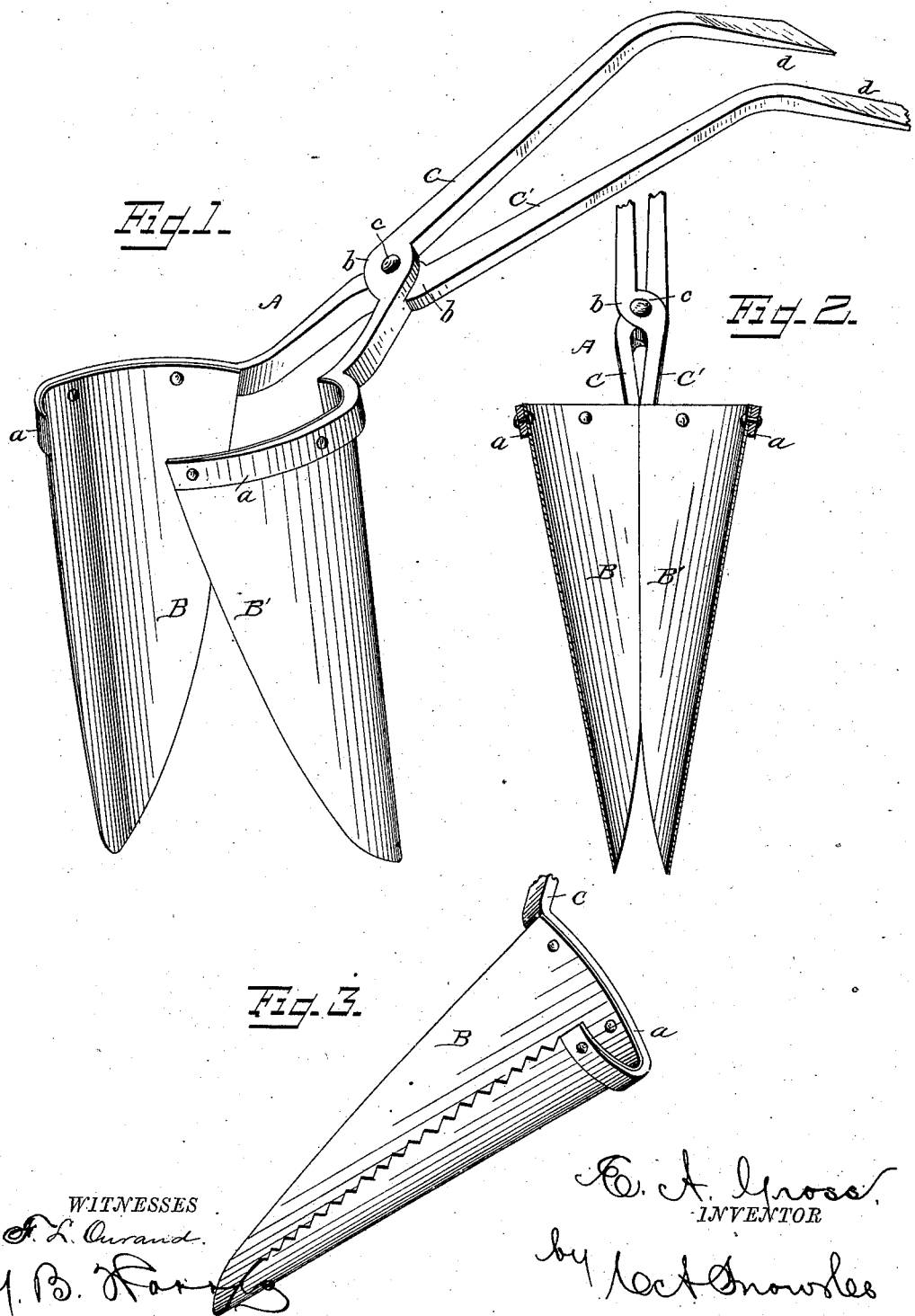

ELAM A. GROSS, OF CAMDEN, NEW JERSEY.

TRANSPLANTER.

SPECIFICATION forming part of Letters Patent No. 293,652, dated February 19, 1884.

Application filed January 9, 1884. (No model.)

*To all whom it may concern:*

Be it known that I, ELAM A. GROSS, a citizen of the United States, residing at Camden, in the county of Camden and State of New Jersey, have invented a new and useful Transplanter, of which the following is a specification, reference being had to the accompanying drawings.

My invention relates to transplanters; and it has for its object to provide a device of this character which shall be simple in its construction and effective in its operation.

A further object of the invention is to provide the handles of the transplanter with spades or trowels, whereby the dirt and roots may be removed from around the plant.

The invention consists in the improved construction and combinations of parts hereinafter fully described, and pointed out in the claim.

In the drawings, Figure 1 is a perspective view of a transplanter constructed in accordance with my invention. Fig. 2 is a vertical section of the same, and Fig. 3 is a perspective view of a modification.

A represents the transplanter, which is composed of two sections hinged together and constructed as follows:

B B' represent the two sections comprising the transplanter, and which are made semicircular in form, the diameter of the sections decreasing as it reaches the ends, said ends terminating in a point. To the top edges of these sections B B' are riveted or otherwise secured the ends $a$ of the handles C C', which are made in form to correspond to the shape of the top of the sections of the transplanter. These handles project nearly at right angles to the sections B B', and are provided near their lower ends with enlarged portions $b$, through which passes a rivet or bolt, $c$, for pivoting the handles together. The ends of these handles C are formed with trowels or spades $d$, which are used to loosen the weeds and rubbish from around a plant when it is desired to remove the same for transplanting.

In Fig. 3 I have shown a modification in which the edges of the sections B B' are serrated, thus enabling the edges to thoroughly cut any weeds or roots that they may come in contact with when being closed upon the plant.

Having fully described my invention, what I claim as new, and desire to secure by Letters Patent, is—

The herein-described transplanter A, consisting of the sections B B', having the serrated edges, as shown, handles C, secured at their upper ends, said handles overlapping one another, and provided with enlarged portions near their ends to receive a rivet or bolt for pivoting the sections together, said handles extending at nearly a right angle to the sections B B', substantially as set forth.

In testimony that I claim the foregoing as my own I have hereto affixed my signature in presence of two witnesses.

ELAM A. GROSS.

Witnesses:
T. F. BOARDMAN,
JAMES M. CASSADY.